United States Patent
Mamitsu et al.

(10) Patent No.: US 7,591,727 B2
(45) Date of Patent: Sep. 22, 2009

(54) ROTATION STRUCTURE OF OPERATING MEMBER FOR GAME MACHINE, AND VIDEO GAME DEVICE

(75) Inventors: Hirofumi Mamitsu, Himeji (JP); Yuji Tamura, Akashi (JP)

(73) Assignee: Konami Corporation, Tokyo (JP)

( * ) Notice: Subject to any disclaimer, the term of this patent is extended or adjusted under 35 U.S.C. 154(b) by 264 days.

(21) Appl. No.: 10/547,187

(22) PCT Filed: Mar. 10, 2004

(86) PCT No.: PCT/JP2004/003064

§ 371 (c)(1),
(2), (4) Date: Aug. 25, 2005

(87) PCT Pub. No.: WO2004/087273

PCT Pub. Date: Oct. 14, 2004

(65) Prior Publication Data

US 2006/0094505 A1    May 4, 2006

(30) Foreign Application Priority Data

Mar. 28, 2003    (JP)    ............................... 2003-090216

(51) Int. Cl.
*A63F 9/24*    (2006.01)
*A63F 13/00*    (2006.01)
*G06F 17/00*    (2006.01)
*G06F 19/00*    (2006.01)

(52) U.S. Cl. ...................................................... 463/37
(58) Field of Classification Search ...................... 463/6; 180/204, 6.2, 6.24, 9.38, 12, 19.2, 23; 273/148 B, 273/148 R; 124/4, 5, 6, 7, 8, 9
See application file for complete search history.

(56) References Cited

U.S. PATENT DOCUMENTS

| | | | | |
|---|---|---|---|---|
| 3,667,311 A | * | 6/1972 | Wysong | .................... 74/424.75 |
| 4,739,673 A | * | 4/1988 | Ishikawa et al. | ............... 74/493 |
| 5,056,787 A | * | 10/1991 | Mitsuyoshi | .............. 273/148 B |
| 5,816,594 A | * | 10/1998 | Howard | ........................ 280/90 |
| 6,171,186 B1 | * | 1/2001 | Kurosawa et al. | .............. 463/31 |

FOREIGN PATENT DOCUMENTS

| | | |
|---|---|---|
| EP | 0 392 014 | 10/1990 |
| JP | 2002-14736 | 1/2002 |

* cited by examiner

*Primary Examiner*—Dmitry Suhol
*Assistant Examiner*—Reginald A Renwick
(74) *Attorney, Agent, or Firm*—Jordan and Hamburg LLP (57) ABSTRACT

A game-machine operation-member rotation structure 3 is provided in which an operation member 31 attached to a rotation shaft 34 supported so as to rotate is turned right and left, including: a moving body 352 which protrudes in the radial direction of the rotation shaft 34, rotates together with the rotation shaft 34 and moves freely in the axial direction; a spiral guide 36 which is concentric with the rotation shaft 34 and moves the moving body 352 in the axial direction as the rotation shaft 34 rotates; and a stopper which is disposed on a movement locus of the moving body 352.

14 Claims, 5 Drawing Sheets

ROTATION STRUCTURE OF OPERATING MEMBER FOR GAME MACHINE, AND VIDEO GAME DEVICE

TECHNICAL FIELD

The present invention relates to a game-machine operation-member rotation structure and a video game apparatus in which an operation member attached to a rotation shaft supported so as to rotate is turned right and left.

BACKGROUND ART

Figure 9:
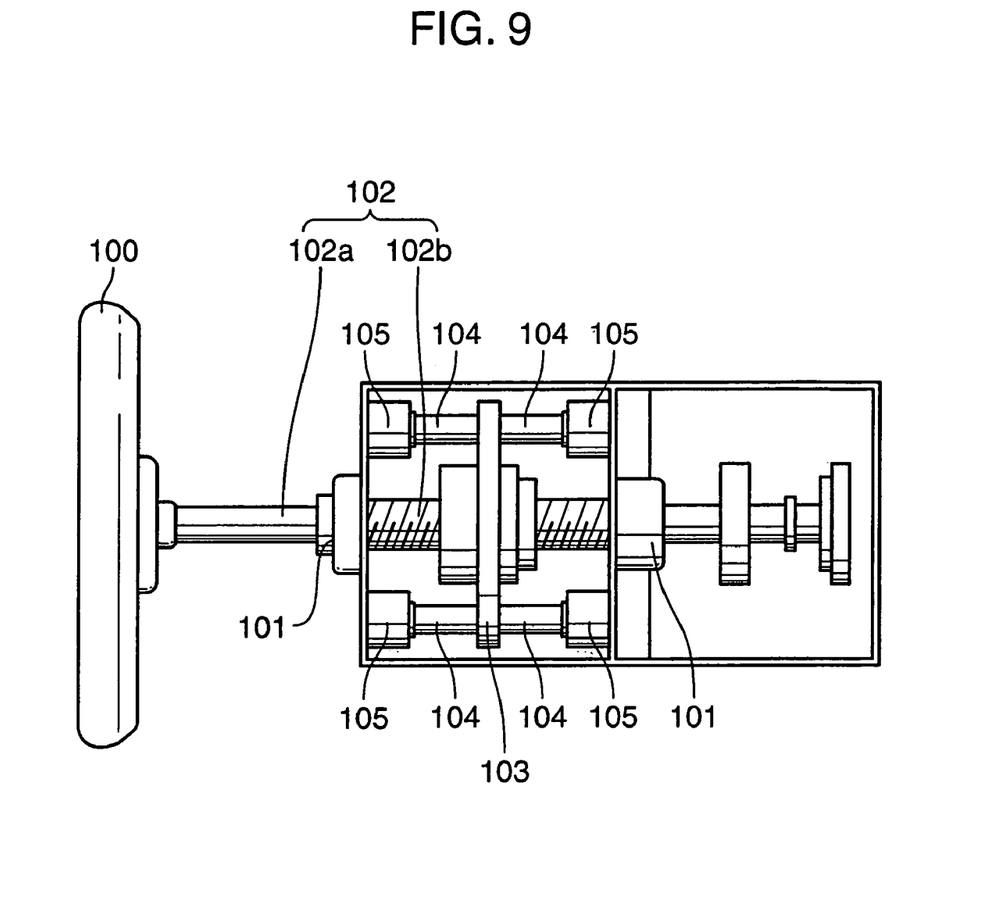
FIG. 9 is a side view of a conventional operation-member rotation structure.

Conventionally, a game-machine operation-member rotation structure has been known in which an operation member is turned right and left that is attached to a rotation shaft which is supported so as to rotate. FIG. 9 is a side view of a conventional game-machine operation-member rotation structure. A conventional video game apparatus is provided with a dummy steering wheel 100 as the operation member. To this dummy steering wheel 100, the game-machine operation-member rotation structure is attached which includes: a main shaft 102 which has a rotation shaft 102a that is supported on a pair of bearings 101 so as to rotate, and a screw shaft 102b that is connected to this rotation shaft; a moving plate 103 which is screwed on the screw shaft 102b; a pair of columnar support shafts 104 which each penetrate a hole that is formed in each predetermined position above and below this moving plate 103, and extend in the directions parallel to the main shaft 102; and a stopper 105 which is disposed at each end of this support shaft 104.

If an operator turns the above described dummy steering wheel 100 to the right from its middle position (i.e., the position in which the moving plate 103 is in the position shown in FIG. 9), the main shaft 102 also rotates clockwise. This rotation of the main shaft 102 causes the moving plate 103 to move, along the support shafts 104, in the directions apart from the dummy steering wheel 100. Then, if the dummy steering wheel 100 is turned to the right by one or more rotations to reach a predetermined position, then the moving plate 103 comes into contact with the stopper 105, so that its further movement is restricted. On the other hand, if the dummy steering wheel 100 is turned to the left, the main shaft 102 also rotates counterclockwise. This causes the moving plate 103 to move, along the support shafts 104, in the directions close to the dummy steering wheel 100. Then, if the dummy steering wheel 100 is turned to the left up to a predetermined position beyond one rotation, then the moving plate 103 comes into contact with the stopper 105. Thereby, the dummy steering wheel 100 is restrained from being further turned.

In such a conventional game-machine operation-member rotation structure, a screw shaft and a moving plate screwed on this will change a rotational force which is given to an operation member into a movement force in the thrust directions. Then, the moving plate moves on to a predetermined position and comes into contact with a stopper, so that its movement is stopped. Therefore, when the moving plate is kept in contact with the stopper, or immediately before it comes into contact, if the rotational force which is applied on the operation member continues or remains, then after the moving plate has come into contact with the stopper, an excessive rotational force works on the screw-structure part between the screw shaft and the moving plate. Then, this screw-structure part (e.g., a thread) can be worn out, deformed and then broken, thus producing so-called shakiness. Besides, the stopper can be destroyed, and in an aspect which has the function of automatically restoring the operation member to a reference position, the above described shakiness may affect a control system for the restoration.

In order to resolve the above described disadvantages, it is an object of the present invention to provide a game-machine operation-member rotation structure and a video game apparatus which are capable of stably holding a position in which a moving body comes into contact with a stopper, even if an excessive rotational force is applied on an operation member.

DISCLOSURE OF THE INVENTION

In order to attain the above described object, a game-machine operation-member rotation structure according to the present invention, in which an operation member is rotated right and left, the operation member being attached to a rotation shaft which is supported so as to rotate, characterized by including: a moving body which protrudes (directly or via a member) in the radial direction of the rotation shaft, rotates together with this rotation shaft and moves freely in the axial direction; a spiral guide (including a spiral and a substantially spiral) which is concentric with the rotation shaft and moves the moving body in the axial direction as the rotation shaft rotates; and a stopper which is disposed on a movement locus of the moving body.

According to this configuration, the rotation shaft is rotated when an operator turns the operation member. Thereby, the moving body which protrudes from the rotation shaft is united and rotated with the rotation shaft. Then, it is guided on the spiral guide and moves in the axial direction. In other words, when the operator turns the operation member, an external force is applied on the operation member in the turning direction. This external force causes the moving body to rotate in the same direction and move in the axial direction. Then, the moving body comes into contact with the stopper which is disposed at each end of the spiral guide. Thereby, the moving body is restrained from moving, and the rotation shaft is also hindered from rotating. Hence, a curb is directly placed on the moving body which rotates together with the operation member. This can eliminate the conventional disadvantage in that the screw-structure part may be worn out. Therefore, the moving body's contact with the stopper can be stably held.

BEST MODE FOR IMPLEMENTING THE INVENTION

Hereinafter, an example of the embodiment of the present invention will be described using FIG. 1 to FIG. 9.

Figure 1:
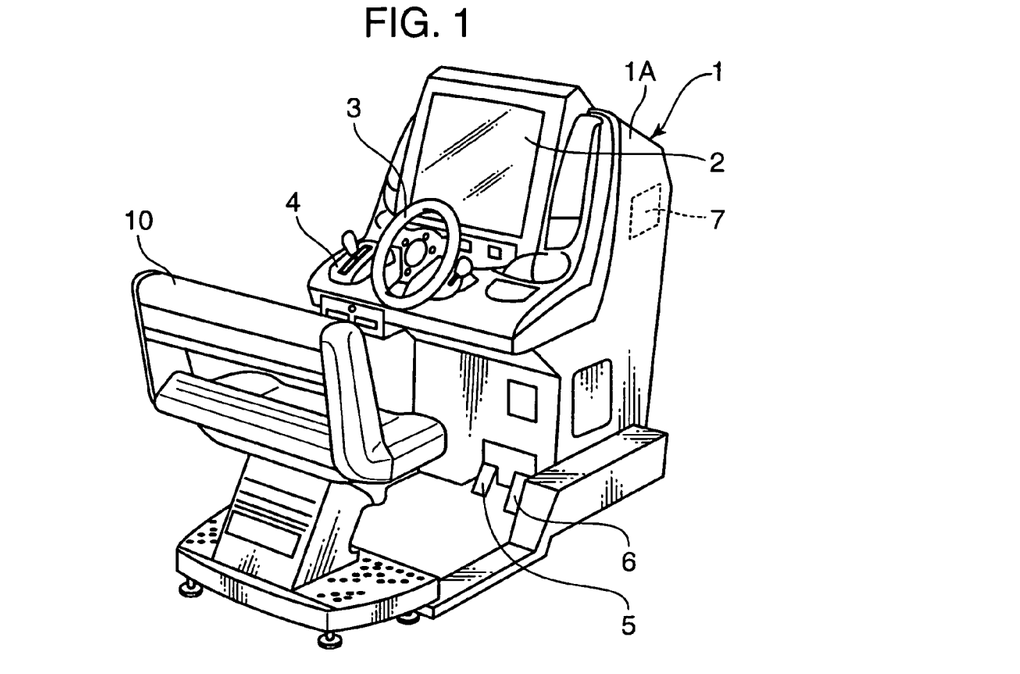
FIG. 1 is a perspective view of a video game apparatus using a dummy steering wheel according to an embodiment of the present invention, showing its external appearance.

FIG. 1 is a perspective view of a video game apparatus using a dummy steering wheel according to an embodiment of the present invention, showing its external appearance.

This video game apparatus displays a virtual automobile race in a game space which is performed by a player. It is configured by a game-machine body 1 and a driver's seat 10 in which a player sits down. They are united or semi-fixed to each other on both sides at their bottoms.

The game-machine body 1 includes a console box 1A, and at its upper part, a monitor 2 for displaying an image is provided opposite to the driver's seat 10. In an operation panel below the monitor 2, there is disposed a dummy steering portion 3. A gear shift lever 4 is placed on the left of the dummy steering portion 3. Besides, in the lower part of the game-machine body 1, a brake pedal 5 and an accelerator pedal 6 are provided which simulate a brake pedal and an accelerator pedal so that a person can step on them.

In the game-machine body 1, a control portion 7 is embedded which includes a control substrate or the like and controls the progress (e.g., the display of an image) of an automobile-race game on a monitor screen. In the control portion 7, an operation signal is inputted from the dummy steering portion 3, the operation portion 4, the brake pedal 5 and the accelerator pedal 6. It processes those kinds of signals based on a predetermined game program, so that a game proceeds.

Figure 2:
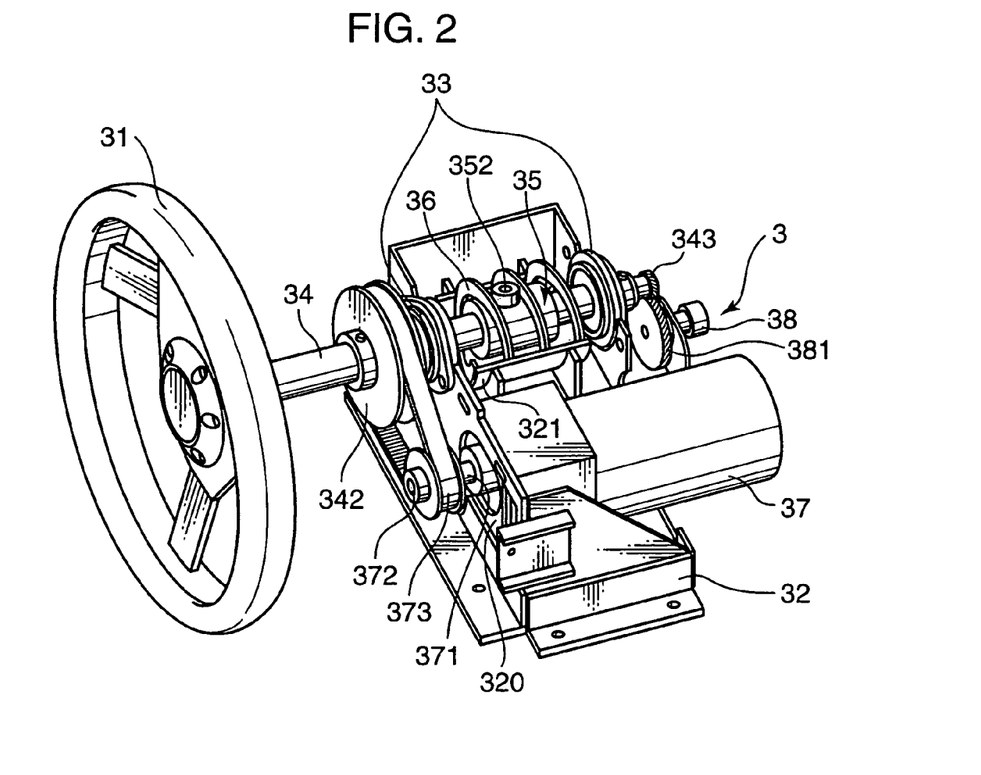
FIG. 2 is a perspective view of a dummy steering portion shown in FIG. 1, showing its whole part.
Figure 3:
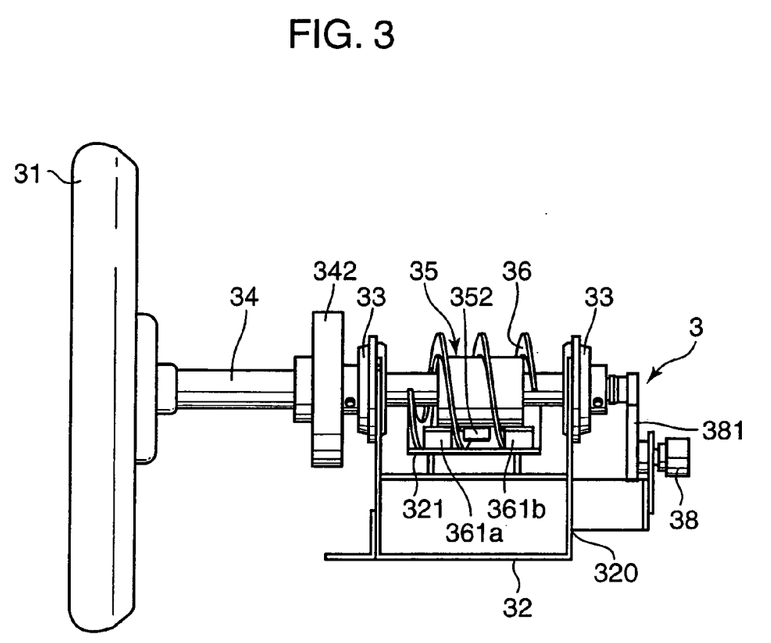
FIG. 3 is a side view of the dummy steering portion shown in FIG. 2.

FIG. 2 is a perspective view of a dummy steering portion shown in FIG. 1, showing its whole part. FIG. 3 is a side view of the dummy steering portion shown in FIG. 2.

The dummy steering portion 3 includes a dummy steering wheel 31, and a main shaft 34 which supports the dummy steering wheel 31 so that it can be turned. The dummy steering portion 3 is provided with a base 32 which has upright walls 320 that are opposite to each other in the depth directions. In the base 32, bearings 33 are disposed at both upright walls. A main shaft 34 is supported so as to pass through these bearings 33, 33. On the main shaft 34, a moving body 35 which has a predetermined length is fitted from outside between both bearings 33. The relation between the main shaft 34 and the moving body 35 will be described with reference to FIGS. 4A and 4B.

Figure 4A:
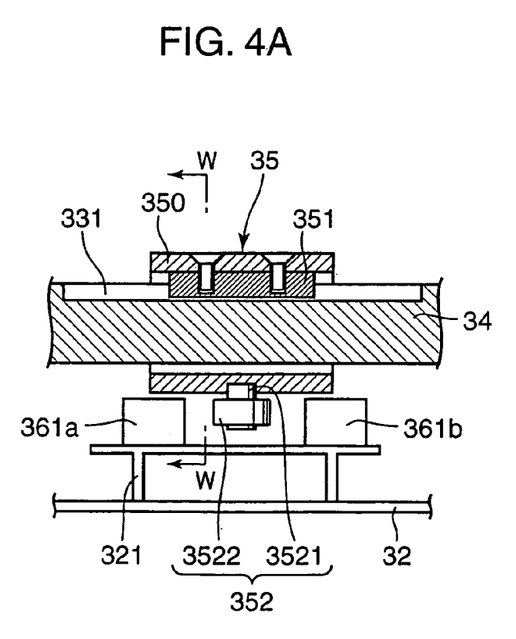
FIG. 4A is a partially longitudinal-sectional view of the dummy steering portion, showing the relation between a main shaft 34 and a moving body 35.
Figure 4B:
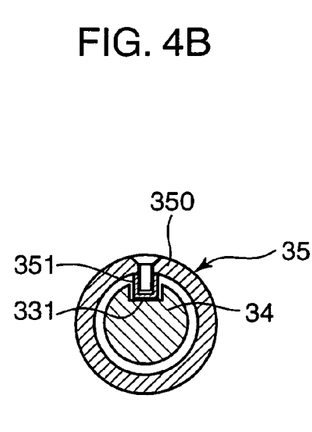
FIG. 4B is a cross-sectional view of the main shaft 34 and the moving body 35.

FIGS. 4A and 4B show the relation between the main shaft 34 and the moving body 35. FIG. 4A is a partially longitudinal-sectional view. FIG. 4B is a cross-sectional view (in a w-position). In FIGS. 4A and 4B, in the main shaft 34, a groove 331 is formed at its substantially middle part. The groove 331 lies at a suitable place in the circumferential directions and has a predetermined length in the axial direction. The moving body 35 includes a cylindrical member 350, and a key member 351 which protrudes at a proper place in the circumferential directions on the inner surface of the cylindrical member 350. The key member 351 is attached by a screw or the like. This key member 351 is fitted into the groove 331, so that the moving body 35 is united and rotated with the main shaft 34. Besides, the key member 351 is set to be shorter than the groove 331 in the longitudinal directions. Thereby, the moving body 35 is designed to be able to move by a predetermined distance in the longitudinal directions over the formation region of the groove 331. In addition, on the cylindrical member 350, a protrusion body 352 which protrudes from the outer surface of the cylinder is fixed at a part in the circumferential directions and preferably substantially in the middle in the longitudinal directions. In this embodiment, the protrusion body 352 is formed by an upright shaft body 3521, and a roller 3522 which can rotate around the shaft body 3521. In the roller 3522, at least its surface is made of, desirably, an elastic material.

In FIG. 2, a support plate portion 321 is disposed in the upper part of the base 32. Besides, above this, a spiral guide member 36 is fixed at its peripheral edge on the support plate portion 321. It has a helical shape and its axial center line lies in the main-shaft directions. The spiral guide member 36 is formed by processing a belt-shaped plate material into a helical shape. Its internal diameter is set to be fitted from outside on the cylindrical member 350. In this embodiment, this spiral guide member 36 has a helix of substantially three rounds, so that the dummy steering wheel 31 can be turned up to an angle beyond at least one turn in the right and left directions. Besides, stoppers 361a, 361b jut out on the support plate portion 321 and at both ends of the spiral guide member 36. The stoppers 361a, 361b are located to interfere in the turning orbit of the protrusion body 352 in the moving body 35. Thereby, the protrusion body 352 is restrained from turning.

Specifically, as the main shaft 34 rotates, the protrusion body 352 in the moving body 35 is turned around the main shaft 34. This turn causes itself to come into contact with and rub against the helical surface of the spiral guide member 36 (in this embodiment, the roller 3522 rolls and moves on the helical surface). Thereby, the moving body 35 is moved in the axial direction. Then, if the dummy steering wheel 31 is turned by a required angle, the protrusion body 352 comes into contact with the stopper 361a or 361b in the circumferential directions. Thereby, the dummy steering wheel 31 is kept from turning further. On the other hand, even if the dummy steering wheel 31 is turned in the opposite direction, then in the same way, it comes into contact with the stopper 361a or 361b at the other end. Thereby, it is restrained from turning beyond this.

Next to the support plate portion 321 (on the downside in FIG. 2) on the base 32, a drive portion is fixed, for example, a motor 37. It has a revolution shaft 371 which is parallel to the main shaft 34 or is directed toward this side. To the revolution shaft 371, a pulley 372 is attached at its tip. To the main shaft 34, a pulley 342 which has a required diameter is attached on the side of the dummy steering wheel 31. Between the pulleys 342 and 372, an endless belt 373 is stretched, so that a driving force from the motor 37 can be transmitted to the pulley 342.

On the other hand, a gear 343 is attached to the depth-side end of the main shaft 34. On the depth side of the base 32, a variable resistor 38 is attached as a turning-angle detecting means. The variable resistor 38 includes a rotation shaft, and to this rotation shaft, a gear 381 is connected which engages with the gear 343. Therefore, the rotation of the main shaft 34 is detected by the variable resistor 38. As a result, the turning angle of the dummy steering wheel 31 can be detected. For example, when the dummy steering wheel 31 is in its neutral position or in the position so that the vehicle runs straight, an output voltage from the variable resistor 38 is set at 2.5V. The output voltage is also set to 0V when it is turned to the maximum in one direction, and it is set to 5V when it is turned to the maximum in the other direction. In that case, if an output voltage is detected from the variable resistor 38, the position in which the dummy steering wheel 31 is turned can be detected. The motor 37 receives a detection result from the variable resistor 38, and generates a torque so that the output voltage of the variable resistor 38 becomes 2.5V. Hence, a servo control system is configured. Besides, according to a right-and-left turning angle from the neutral position, control is executed so that a torque for generating a reaction force can be produced. This gives an operator a feeling that the operator is really driving when turning the dummy steering wheel 31.

Figure 5:
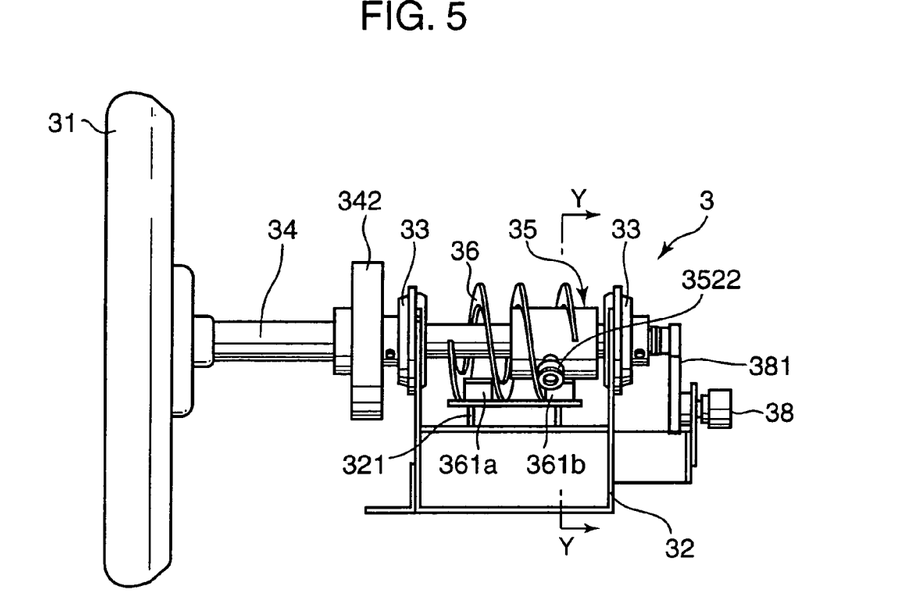
FIG. 5 is a side view of the dummy steering portion which corresponds to FIG. 3, showing a state in which the dummy steering wheel is turned rightward to the maximum.
Figure 6:
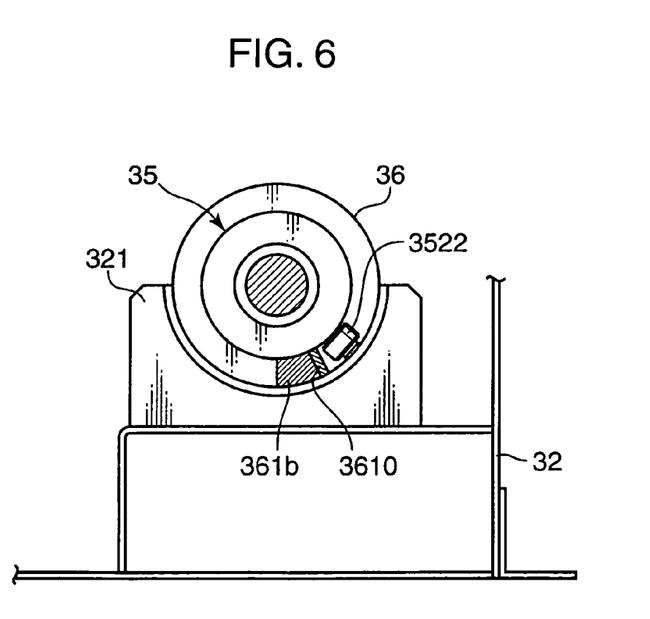
FIG. 6 is a sectional view of the dummy steering portion in a y-position shown in FIG. 5.

Next, a turning operation and a turn-restraint operation of the dummy steering wheel 31 will be described using FIGS. 5 to 8. FIG. 5 is a side view which corresponds to FIG. 3 at the time when a dummy steering wheel is turned right to the maximum. FIG. 6 is a sectional view (seen from the side of the dummy steering wheel 31) of the dummy steering portion in a y-position shown in FIG. 5.

If an operator gives a right-turning force to the dummy steering wheel 31 in the neutral position shown in FIG. 3, the main shaft 34 is also rotated in the right direction. Together with the rotation of the main shaft 34, the roller 3522 of the protrusion body 352 rolls in contact with the helical surface of the spiral guide member 36. The protrusion body 352 (which is located in the middle of its movement locus in the neutral position) also moves along the helical surface. As the roller 3522 moves along the helical surface, the moving body 35 is moved along the groove 331 of the main shaft 34 in the direction apart from the dummy steering wheel 31.

Then, the dummy steering wheel 31 is further turned rightward, the roller 3522 comes into contact with the stopper 361b and is restrained from rotating. This stopper 361b on the depth side has a hollow contact surface which is fitted on the curved surface of the roller 3522. To this hollow part, a rubber member 3610 is stuck as an elastic member.

Thereby, even if an operator attempts to turn the dummy steering wheel 31 beyond the right restraint position, the operator cannot turn the dummy steering wheel 31. Besides, the roller 3522 comes into contact with the rubber member 3610, thus preventing an impact from being given to the stopper 361b when it comes into contact. In addition, the stopper 361b has the hollow shape so as to be fitted on the curved surface of the roller 3522. This effectively prevents the stopper 361b from being worn out in its part which comes into contact with the roller 3522.

Figure 7:
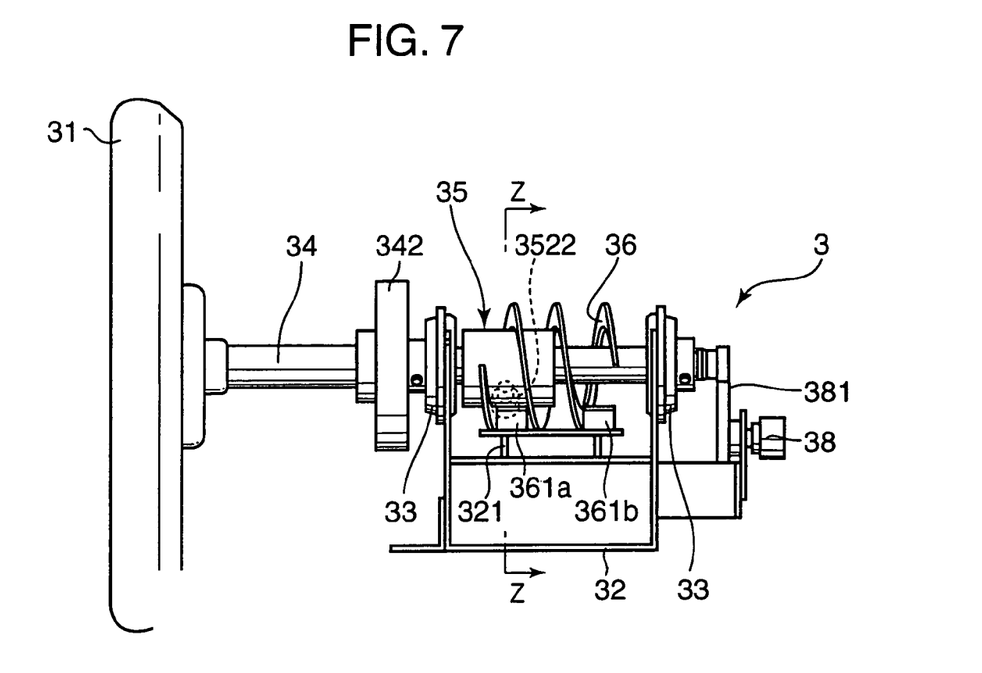
FIG. 7 is a side view of the dummy steering portion which corresponds to FIG. 3, showing a state in which the dummy steering wheel is turned leftward to the maximum.
Figure 8:
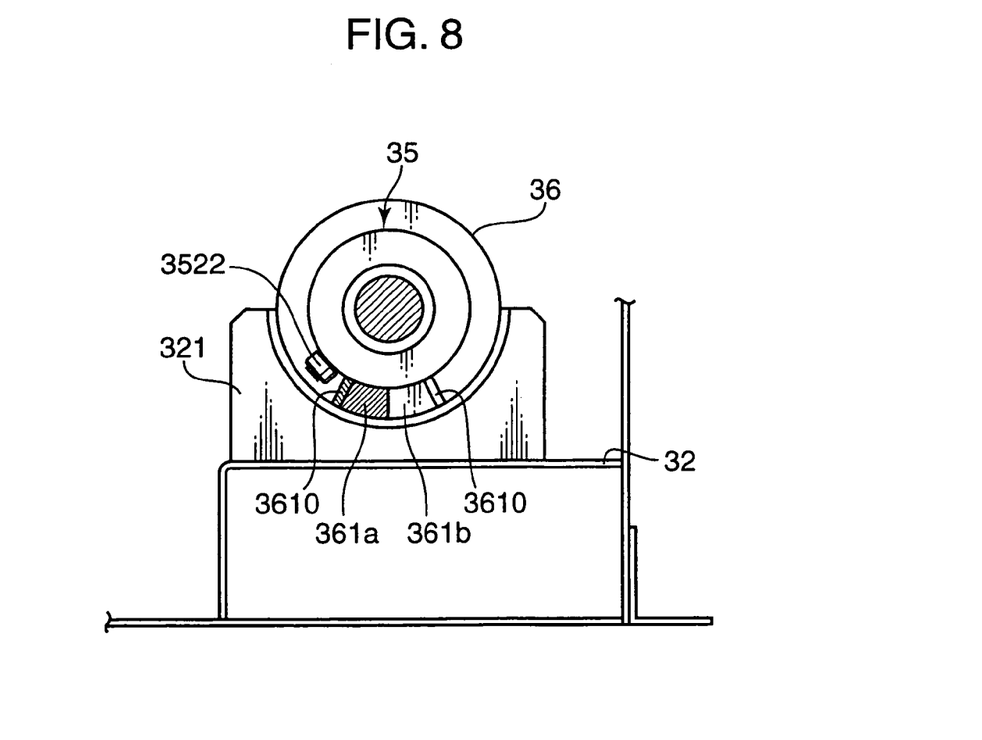
FIG. 8 is a sectional view of the dummy steering portion in a z-position shown in FIG. 7.

FIG. 7 is a side view which corresponds to FIG. 3 when the dummy steering wheel is turned leftward to the maximum. FIG. 8 is a sectional view (seen from the side of the dummy steering wheel 31) of the dummy steering portion in a z-position shown in FIG. 7.

If an operator gives a left-turning force to the dummy steering wheel 31 in the neutral position shown in FIG. 3, the main shaft 34 is also rotated in the left direction. Together with the rotation of the main shaft 34, the roller 3522 of the protrusion body 352 rolls in contact with the helical surface of the spiral guide member 36. The protrusion body 352 also moves along the helical surface. As the protrusion body 352 moves along the helical surface, the moving body 35 is moved along the groove 331 of the main shaft 34 in the direction of the dummy steering wheel 31.

Then, the dummy steering wheel 31 is turned leftward, the roller 3522 comes into contact with the stopper 361b and is restrained from rotating. This stopper 361a on the side of the dummy steering wheel 31 has a hollow left-hand surface which is fitted on the curved surface of the roller 3522. The rubber member 3610 is stuck to this hollow part.

According to this configuration, even if an operator attempts to turn the dummy steering wheel 31 beyond the left restraint position, the operator cannot turn the dummy steering wheel 31. In the video game apparatus according to this embodiment, according to the above described dummy steering portion 3, the dummy steering wheel 31 can be moved by at least one right turn and one left turn from the neutral position.

If an operator turns the dummy steering wheel 31, the turning angle of the dummy steering wheel 31 is detected by the variable resistor 38. Then, the output voltage which corresponds to this turning angle is transferred to the control portion 7. Based on this output voltage, the control portion 7 moves and displays an automobile virtually driven by the operator which is displayed in the monitor 2. For example, if an output voltage of 2.5V is detected by the control portion 7, the automobile is oriented forward and displayed. If an output voltage above 2.5V which indicates a right-turn angle is detected by the control portion 7, the automobile is displayed so as to move rightward by the degree which corresponds to the turning angle. On the other hand, if an output voltage below 2.5V which indicates a left-turn angle is detected by the control portion 7, the automobile is displayed in the monitor 2 so that it moves leftward by the degree which corresponds to the turning angle. Besides, if the operator releases the dummy steering wheel 31 after turning it from the neutral position, the motor 37 gives a rotating torque to the pulley 342 so that the output voltage of the variable resistor 38 becomes 2.5V. Thereby, the dummy steering wheel 31 is automatically returned to the neutral position. In addition, the motor 37 is adjusted so as to apply a predetermined torque in the direction opposite to the operator's turning direction and generate a reaction force required when the operator turns the dummy steering wheel 31.

In this way, an operator turns the dummy steering wheel 31, and thereby, a dummy automobile can be moved in an arbitrary direction. Therefore, a racing game is executed in which the operator drives on a winding racing course and competes to reach a goal point from a starting point ahead of others.

As described above, in the video game apparatus according to this embodiment, even if an operator turns the dummy steering wheel 31 up to a restraint position, the stoppers 361a, 361b can bear an external force which is produced by a turning operation of the dummy steering wheel 31 in a radial direction (i.e., a turning direction of the dummy steering wheel 31). Thereby, a direct restraint is place on the protrusion body 352 which can be turned together with the dummy steering wheel 31. This eliminates a conventional disadvantage in that a spiral-structure part is worn out. Hence, the protrusion body 352's contact with the stopper 361a or 361b is stably held. Thereby, despite an impact at the time when the protrusion body 352 comes into contact with the stopper 361a or 361b, their contact surfaces can be effectively prevented from being deformed. Therefore, even if the dummy steering wheel 31 is designed to be automatically restored to the neutral position, then without affecting a restoration control system, the dummy steering wheel 31 can be constantly returned with precision to the neutral position.

Furthermore, there is no need for a member which changes an external force which is given by an operator into an external force in the thrust directions. This helps reduce the production cost of a video game apparatus. Besides, by changing the position of the stopper 361a or 361b, or the length of the spiral guide member 36, a turning angle at which the dummy steering wheel 31 is restrained from turning can be easily varied.

Especially, the present invention is applied to a case in which a dummy steering wheel is designed to be turned beyond one round, as is the case with the dummy steering portion 3 according to this embodiment. In such a case, according to the configuration of a spiral guide, a moving body and a stopper which is disposed on a movement locus of the moving body, the dummy steering wheel can be effectively restrained from turning.

Herein, the stoppers 361a, 361b are formed on both sides of the spiral guide member 36. However, both stoppers 361a, 361b may also be formed otherwise, as long as they are disposed on a movement locus of the protrusion body 352 and at an interval at the time when the protrusion body 352 turns by a predetermined number of rounds.

Moreover, the spiral guide member 36 is not necessarily a helical shape. Any other shapes are included, as long as it can lead the protrusion body 352 to turn and move in the axial direction of the main shaft 34. Herein, the protrusion body 352 not necessarily includes the roller 3522. The protrusion body 352 may also be a protrusion which can be guided and moved by the spiral guide member 36.

Herein, the present invention is not limited to a structure in which the dummy steering wheel 31 is turned. It can be applied to a game-machine operation-member rotation structure which turns, at least forward and reversely, an operation member attached to a rotation shaft that is supported so as to rotate.

INDUSTRIAL APPLICABILITY

In the game-machine operation-member rotation structure according to the present invention, as an operator turns an operation member, a moving body rotates in the turning direction of the operation member, moves in the axial direction and comes into contact with a stopper. Therefore, an external-force load on the stopper becomes lighter than that in the thrust directions (i.e., the axial direction of a rotation shaft). Thereby, even if the operator turns the operation member by applying an excessive force shortly after the operation member is restrained from turning or after it is restrained, the operation member can be effectively prevented from turning further. This helps sufficiently prevent the stopper structure from being deformed and also helps stably hold the moving body's contact position with the stopper.

This application is based on Japanese Patent Application Serial No. 2003-090216, filed on Mar. 28, 2003, the contents of which are hereby incorporated by reference.

The invention claimed is:

1. A game-machine operation-member rotation structure comprising:
   a base which is provided stationary on said structure;
   an operation member rotatable right and left, the operation member being attached to a rotation shaft which is supported so as to rotate;
   a moving body having a protrusion which protrudes in the radial direction from the rotation shaft, the moving body and the protrusion rotating together with the rotation shaft and moving freely in an axial direction of the rotation shaft;
   a spiral guide which is provided fixed stationary to said base and concentric with the rotation shaft and moves the moving body in the axial direction as the rotation shaft rotates; and
   a stopper which is disposed on a movement locus of the moving body and is engaged by direct rotational displacement of the moving body by rotation of the rotation shaft.

2. The game-machine operation-member rotation structure according to claim 1, wherein at least the part of the stopper which comes into contact with the moving body is an elastic member.

3. A video game apparatus, comprising:
   the game-machine operation-member rotation structure according to claim 1, wherein the operation member is a dummy steering wheel for an automobile; and
   further comprising an image-display controlling means for moving a virtual vehicle in a game space as the dummy steering wheel is rotated.

4. A game-machine operation-member rotation structure comprising:
   a base which is provided stationary on said structure;
   an operation member rotatable right and left, the operation member being attached to a rotation shaft which is supported so as to rotate;
   a moving body which protrudes in the radial direction from the rotation shaft, rotates together with the rotation shaft and moves freely in an axial direction of the rotation shaft;
   a spiral guide which is provided fixed stationary to said base and concentric with the rotation shaft and moves the moving body in the axial direction as the rotation shaft rotates; and
   a stopper which is disposed on a movement locus of the moving body and is engaged by direct rotational displacement of the moving body by rotation of the rotation shaft, wherein:
      the moving body has a cylindrical member which is fitted on the rotation shaft so that the cylindrical member slides freely, a key member which protrudes inward from the cylindrical member, and a protrusion portion which protrudes outward from the cylindrical member and slides on the spiral guide;
      the rotation shaft has a groove portion in the axial direction; and
      the key member is fitted into the groove portion so that the cylindrical member can move in the axial direction of the rotation shaft.

5. The game-machine operation-member rotation structure according to claim 4, wherein the protrusion portion is formed by a support shaft which stands in the radial direction, and a roller which is provided on the support shaft.

6. A game-machine operation-member rotation structure, comprising:
   a base which is provided stationary on said structure;
   a rotation shaft rotatable supported on the base;
   an operation member which is attached to the rotation shaft and is rotatable by a user to right and left directions so as to rotate said rotation shaft;
   a movable assembly having a cylindrical member which is fitted on the rotation shaft so as to rotate together with the rotation shaft and to move freely on the rotation shaft in an axial direction of the rotation shaft;
   said movable assembly having a protrusion portion which protrudes radially outward from the cylindrical member and includes:
      a support shaft which extends in a radial direction of said rotation shaft; and
      a roller which is provided rotatably on said support shaft;
   a spiral guide provided stationary with respect to said base and concentric with said rotation shaft, said spiral guide being configured to guide the movable assembly to slide along said rotation shaft in the axial direction as the rotation shaft rotates said movable assembly so as to engage said roller in rotational contact with the spiral guide such that said engagement of said roller with said spiral guide displaces said movable assembly in said axial direction; and a stopper provided on said base which is in a movement locus of the protrusion portion of the movable assembly such that at least part of the stopper comes into contact with the protrusion portion by direct rotational displacement of the protrusion portion by rotation of the rotation shaft and the stopper is an elastic member and such that said stopper thereby restricts rotation of said rotation shaft.

7. The game-machine operation-member rotation structure according to claim 6, wherein:

the cylindrical member has a key member which protrudes inward from the cylindrical member;

the rotation shaft has a groove portion in the axial direction; and the key member is fitted into the groove portion so that the cylindrical member is movable in the axial direction of the rotation shaft.

8. The game-machine operation-member rotation structure according to claim 6, wherein at least the protrusion portion engages the stopper by rotational movement of the protrusion portion.

9. The game-machine operation-member rotation structure according to claim 6, wherein the stopper is fixed stationary on the base.

10. A game-machine operation-member rotation structure, comprising:

a base which is provided stationary on said structure;

a rotation shaft rotatable supported on the base;

an operation member which is attached to the rotation shaft and is rotatable by a user to right and left directions so as to rotate said rotation shaft;

a movable assembly having a shaft mounted member which is fitted on the rotation shaft so as to rotate together with the rotation shaft and to move freely on the rotation shaft in an axial direction of the rotation shaft;

said movable assembly having a protrusion portion which protrudes radially outward from the shaft mounted member;

a spiral guide provided stationary with respect to said base and concentric with said rotation shaft, said spiral guide being configured to guide the movable assembly to slide along said rotation shaft in the axial direction as the rotation shaft rotates said movable assembly so as to engage said roller iii rotational contact with the spiral guide such that said engagement of said roller with said spiral guide displaces said movable assembly in said axial direction; and a stopper provided fixed relative to said spiral guide which is in a movement locus of the protrusion portion of the movable assembly such that at least part of the stopper comes into contact with the protrusion portion by direct rotational displacement of the protrusion portion by rotation of the rotation shaft and is an elastic member and such that said stopper thereby restricts rotation of said rotation shaft.

11. The game-machine operation-member rotation structure according to claim 10, wherein:

the shaft mounted member has a key member which protrudes inward from the shaft mounted member;

the rotation shaft has a groove portion in the axial direction; and the key member is fitted into the groove portion so that the shaft mounted member is movable in the axial direction of the rotation shaft.

12. The game-machine operation-member rotation structure according to claim 10, wherein at least the protrusion portion engages the stopper by rotational movement of the protrusion portion.

13. The game-machine operation-member rotation structure according to claim 10, wherein the stopper is fixed stationary on the base.

14. The game-machine operation-member rotation structure according to claim 10, wherein the movable assembly includes:

a support shaft which extends in a radial direction of said rotation shaft; and a roller which is provided rotatably on said support shaft.

* * * * *